(No Model.)
J. B. GRANT.
METHOD OF TREATING COTTON SEED OIL.
No. 328,024. Patented Oct. 13, 1885.
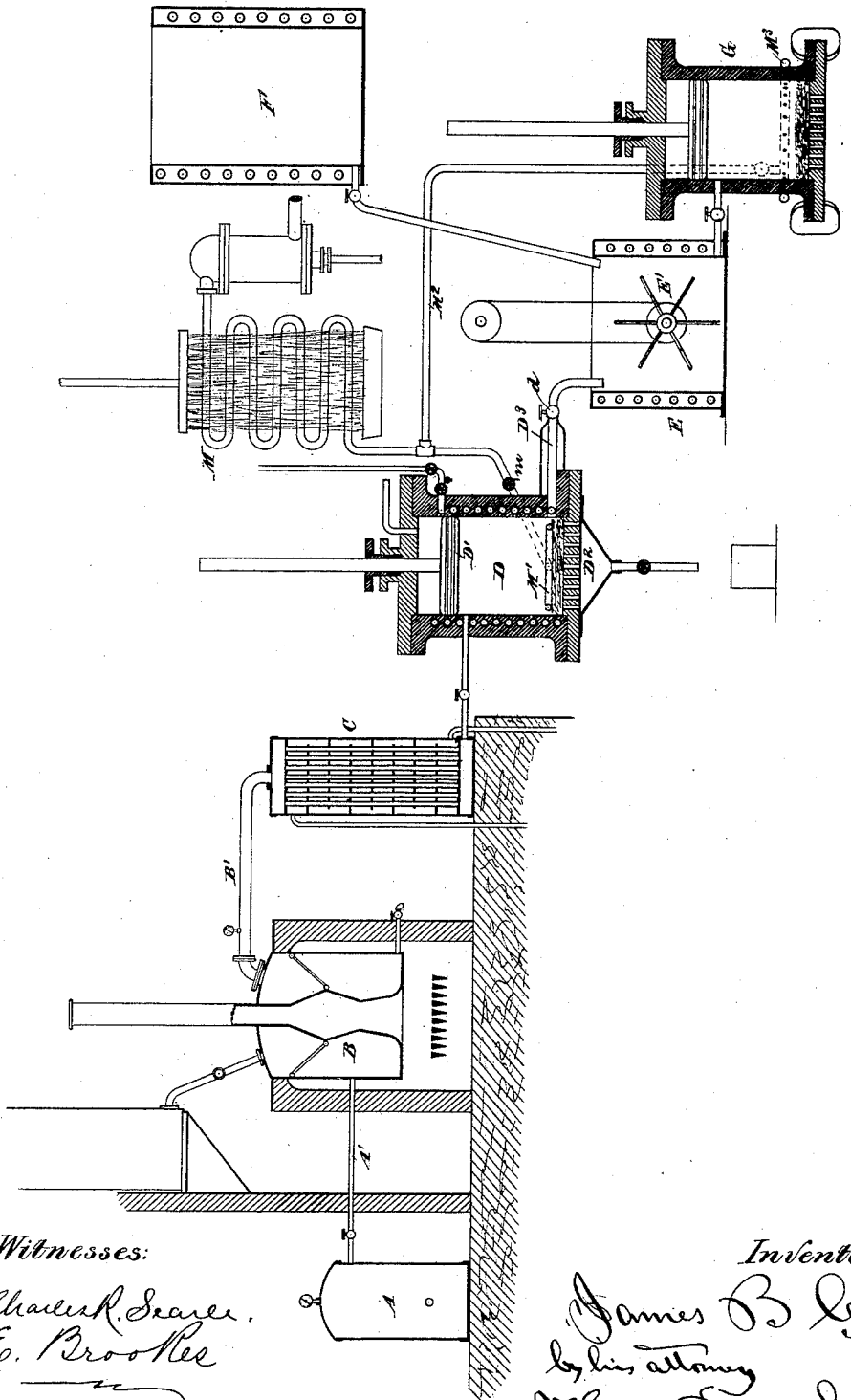
Witnesses:
Charles R. Searle.
E. Brookes
Inventor:
James B. Grant
by his attorney
Thomas Drew Stetson

UNITED STATES PATENT OFFICE.

JAMES B. GRANT, OF NEW YORK, ASSIGNOR TO HIMSELF AND ALLAN MASON, OF BROOKLYN, NEW YORK.

METHOD OF TREATING COTTON-SEED OIL.

SPECIFICATION forming part of Letters Patent No. 328,024, dated October 13, 1885.

Application filed April 6, 1885. Serial No. 161,394. (No model.)

*To all whom it may concern:*

Be it known that I, JAMES B. GRANT, of the city and county of New York, in the State of New York, have invented certain new and useful Improvements in Method of Treating Cotton-Seed Oil and Analogous Oils, of which the following is a specification.

The oil obtained in large quantities from cotton-seed has the property of rapidly absorbing oxygen and becoming rancid. I have discovered that it may be purified by distillation. I have discovered that this oil, either alone or combined with any other suitable oil, may by a proper treatment be brought to a condition in which it will keep for an indefinite period. I distill the oil and thereby remove all the non-volatile impurities, and by partially or entirely saturating it with nitrogen gas, in a manner the theory of which it may not be necessary to explain, counteract its tendency to subsequently become rancid. The distillation leaves a nearly worthless residuum of non-volatile matter, which is removed at intervals and is of no further interest in my process. The more or less volatile material, which assumes the form of vapor in the still and again assumes the form of a liquid in the condenser, is the valuable portion. This is afterward further separated by straining, with pressure, at a low temperature into an oil which is fluid at all temperatures and a hard fat. My treatment produces oil and hard fat possessing peculiarly valuable qualities from cotton-seed oil at a price below that of lard. The oil will never freeze unless the temperature is carried below that at which this treatment is conducted.

It is important that the distillation be effected and the resulting purified oil be condensed and frozen with rapidity. I effect the condensation by long approved means, exposing the vapor to metal surfaces in the form of pipes kept at a low temperature by the circulation of water.

When the oil is returned to its liquid form, it is instantly passed into a chamber, where it can be exposed to a strong hydraulic pressure, with provisions, by straw or analogous material, for straining. In this space I freeze the oil by the direct contact of a volatile material, which is inoffensive. I use carbonic-acid gas. This material is so inoffensive that the expanded and intensely-cold gas is admitted liberally into direct contact with the oil. The refrigeration by this means is rapid and complete. The frozen oil is then subjected to a strong pressure to force out the uncongealed portion, which portion may be sold at a high price for table use, or for other purposes requiring fine oil, without scent or taste, and not liable to become rancid. The hard portions are suitable, either alone or mingled with animal fat, for use in cooking. The carbonic-acid gas admitted upon the vaporized oil has an action superior to that of ice, for the reason that no oxygen can be obtained from the gas.

The accompanying drawing forms a part of this specification, and is an elevation, partly in section, of a set of apparatus adapted to carry out my invention.

Referring to the drawing and to the letters of reference thereon, A is a receiver filled with nitrogen gas, which has been manufactured under pressure, or has been compressed by pumps or otherwise to a tension of from two to three atmospheres.

B is a still of the form and character set forth in the United States patent to me, dated August 21, 1866, No. 57,311. A' is a pipe controlled by a cock, and delivering nitrogen gas from the receiver A to mingle with the vaporized oil in the still B.

B' is a vapor-pipe leading the volatile portion of the cotton-seed oil from the still B to a surface-condenser, C, adapted to produce a prompt condensation.

The carbonic-acid gas may be made practically pure in large quantities at a moderate cost by treating marble-dust with sulphuric acid. It is compressed by suitable pumps, and after the heat of compression has been removed by showering with cold water in a coil, M, is allowed to expand by flowing through a proper controlling cock or valve, *m*. The carbonic acid in the gaseous form, expanded and intensely cold, flows into the perforated pipe M', near the bottom of the oil-chamber, and rising in minute bubbles rapidly cools the oil by its direct contact therewith.

D is the cylinder, and D' the piston, of a hydraulic press. After the piston D' is raised by any suitable means (not shown) and the chamber below is filled or nearly filled with the oil and frozen, the pumps are operated to depress the piston and induce a severe pressure on the oil. The thin portion exudes through the strainer D². Next admitting steam from a boiler (not shown) into a jacket surrounding the chamber D and a discharge-pipe, D³, the hard fat is melted, and on opening the valve d it is delivered as required into a mixing-vessel, E, where it is mixed with any desired proportion of animal fat from a tank, F, and agitated by a revolving wheel, E'. This fat thus mixed with the cotton-seed fat may be melted beef-suet, mutton-tallow, lard, or other animal fat adapted to impart any desired qualities which the purified and practically tasteless and scentless cotton-seed oil does not possess. As soon as thoroughly mixed, the mixed fat is discharged into a tank, G, where it is frozen by treatment with cold carbonic-acid gas received through the pipe M² into the perforated pipe M³, or other convenient distributing means, the cold carbonic acid being received from the same source as before, or from a different source, as convenience may dictate. The fat mixed and instantly frozen under these conditions will remain permanently united, and may be put up in hogsheads or other large or small packages, and stored or transported for use.

Modifications may be made in the forms and proportions of the details. I can vary the temperature and the pressure so as to extract more or less of the oil, and thus adapt the product to any climate. I can conduct the process so as to make three or more grades of products—first, a very limpid oil which will remain fluid at all practicable temperatures; second, a fluid material which remains fluid at ordinary temperatures, but will congeal on being much cooled; and, third, a hard fat solid at all ordinary temperatures.

I can use fish-oil or porpoise-oil as the animal oil for admixture.

I can produce the carbonic-acid gas by other means than those suggested.

Instead of the form of still represented, I can use any other approved or suitable construction which will present the heat moderately and uniformly to the oil and effect a thorough evaporation of its volatile material.

I have devised a form of still which is made the subject of a separate application for patent, and which I believe may be used successfully in this process. In that form the evaporating-chamber is inclosed within a jacket of high-pressure steam, with provision for maintaining the temperature of the steam and for also admitting steam to act both mechanically and chemically in blowing away and aiding to separate the particles of the oil introduced into the still in a small continuous stream.

The process may be applied with some advantage to other oils and fats than those derived from cotton-seed. It is of advantage in treating any oil which is capable of being distilled and which is liable to become rancid. The freezing with carbonic-acid gas may be used with advantage in treating any fat which is to be used for food, whether distilled or not.

I claim as my invention—

1. The within-described process of treating cotton-seed oil or analogous quickly-decomposing oils by distillation in the presence of nitrogen, substantially as herein specified.

2. The process described of treating rapidly-oxidizing fat from cotton-seed and analogous sources by distilling, freezing, pressing, mechanically agitating with other fat, and freezing the combined product, all substantially as herein specified.

3. In the treatment of fat from cotton-seed or other sources, the freezing by the direct application of carbonic-acid gas compressed and operated substantially as herein specified.

4. The product described, composed of fat from cotton-seed and analogous sources distilled, frozen, and pressed, as herein specified.

In testimony whereof I have hereunto set my hand at New York city, New York, in the presence of two subscribing witnesses.

JAMES B. GRANT.

Witnesses:
M. F. BOYLE,
E. BROOKES.